T. J. NASH.
STEERING MECHANISM.
APPLICATION FILED JAN. 4, 1916.
1,202,409.
Patented Oct. 24, 1916.
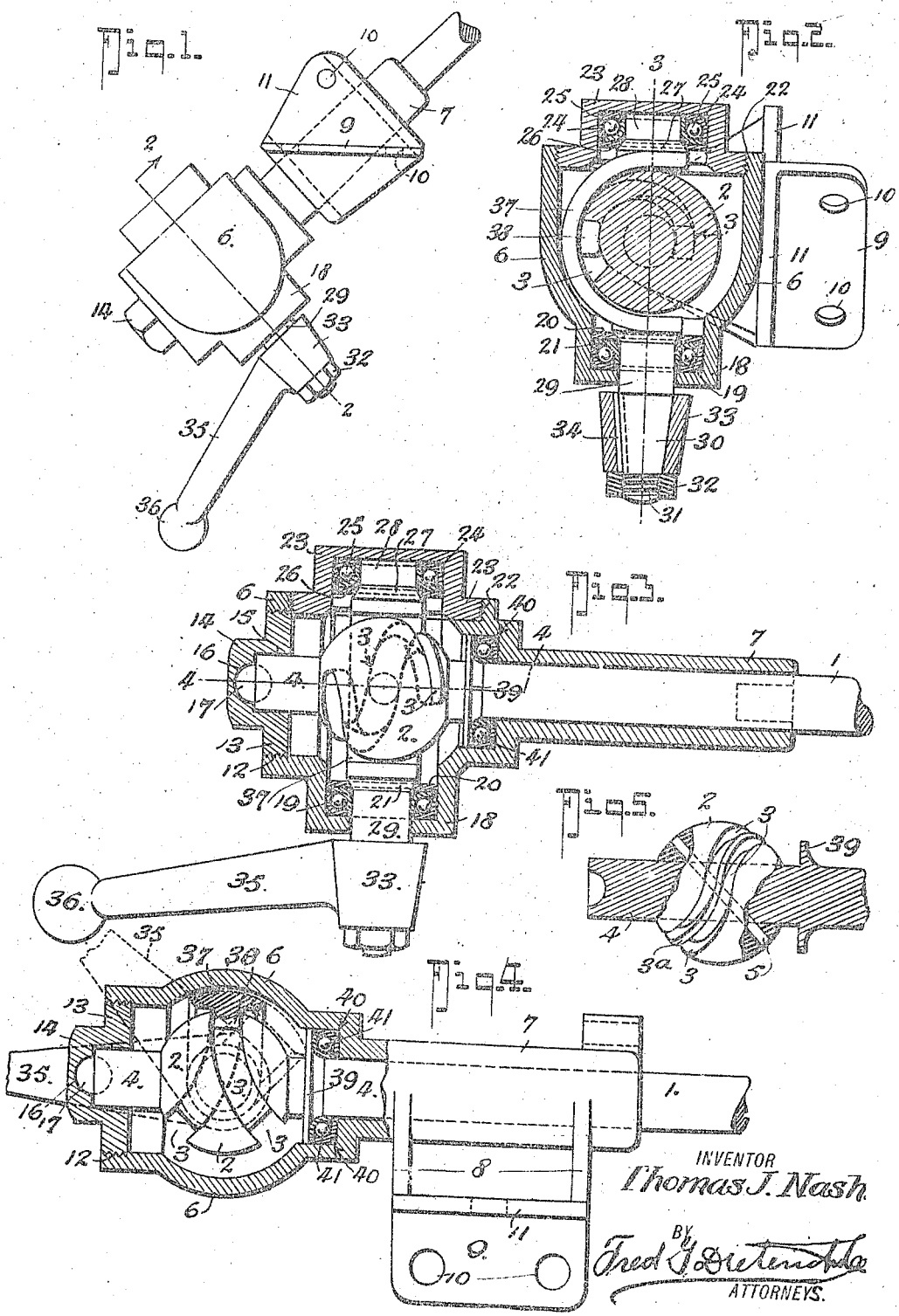
INVENTOR
Thomas J. Nash
BY
Fred J. Dieterich
ATTORNEYS.

UNITED STATES PATENT OFFICE.

THOMAS J. NASH, OF LINCOLN, NEBRASKA, ASSIGNOR TO NASH MANUFACTURING COMPANY.

STEERING MECHANISM.

1,202,409.   Specification of Letters Patent.   Patented Oct. 24, 1916.

Application filed January 4, 1916. Serial No. 70,195.

*To all whom it may concern:*

Be it known that I, THOMAS J. NASH, residing at Lincoln, in the county of Lancaster and State of Nebraska, have invented certain new and useful Improvements in Steering Mechanism, of which the following is a specification.

My invention relates to certain new and useful improvements in steering apparatus of the irreversible type in which the road shocks of the steered wheels are not transmitted to the operator's hand wheel to turn the same.

The invention, in its generic nature is somewhat of the so-called worm gear type of steering apparatus, although differing therefrom in the particular construction of the connection between the crank shaft and the steering post shaft.

In its generic nature, the invention comprises a supporting housing in bearings in which the steering post shaft is journaled, the housing also having bearings for a crank shaft to which the ball arm that connects with the connecting rod of the steering gear is secured, the crank shaft being journaled in bearings in the housing to turn on an axis preferably at right angles to the axis of the steering post rod, there being a special worm connection between the steering post shaft and the crank shaft whereby the turning of the steering post shaft will have its motion directly translated and imparted to the crank shaft.

In its more specific nature the invention includes what I term a globoid-spiral connection between the steering post shaft and the crank shaft whereby the use of the ordinary worm gears may be eliminated without the addition of a greater number of structural parts than the number of those eliminated.

In its specific nature, the invention further includes those novel details of construction, combination and arrangement of parts, all of which will be first fully described, then be specifically pointed out in the appended claims and illustrated in the accompanying drawings, in which:—

Figure 1 is a side elevation of a portion of a steering post shaft, together with the parts constituting my invention. Fig. 2 is a cross section on the line 2—2 of Fig. 1, looking in the direction of the arrow. Fig. 3 is a vertical longitudinal section on the line 3—3 of Fig. 2. Fig. 4 is a horizontal section taken substantially on the line 4—4 of Fig. 3. Fig. 5 is a detail view of a modification of the invention.

In the drawing, in which like numerals of reference indicate like parts in all of the figures, 1 represents the steering post shaft and 2 designates a globular enlargement made either integrally with the shaft 1 or as a separate element pinned or keyed thereto, as indicated at 5 in Fig. 5. The ball 2 is provided with a spiral cut groove 3 of the desired length, the groove 3 being of uniform depth whereby the bottom surface of the groove is in a plane normal to the radius of the ball at any particular middle point in the groove, thus the spiral is not a common worm having a cylindrical bottomed groove but a worm having a spherical bottomed groove and I have therefore termed this a "globoid-spiral" as most nearly descriptive of the curvature involved. Instead of having a single groove 3, a double groove 3 may be provided, the web 3ª of which forming a globoid-spiral thread, as it were, (see Fig. 5).

The shaft 1 has its end 4 journaled in a bearing bore 5 in a removable cap 13 that is threaded at 12 into the casing 6 and is provided with a nut-like portion 14 by means of which it can be conveniently turned, there being a ball thrust bearing recess 16 formed in the cap 13 and in the end of the shaft 4 to receive the thrust bearing ball 17.

The housing 6 has an elongated neck 7 to form the principal bearing for the shaft 1 and from the neck 7 the bracket extensions 8—9—11 are projected the portions 9 and 11 of the bracket lying in planes at right angles to each other and are provided with holes 10 through which the device may be bolted to the frame of the vehicle.

The casing 6 has a projection 18 that is provided with a recess to receive the ball bearing 19 and thrust disk 20, the bearing 19 and disk 20 serving not only as a trunnion bearing member, but also as a thrust bearing, the disk 20 engaging the cone surface 21 of the lower trunnion section 29 of the crank shaft, the upper trunnion section 28 of which is united to the lower section by a yoke 37 and the upper section 28 of the crank shaft trunnion is also journaled in a combined annular and thrust ball bearing 25 whose disk 26 engages the cone 27 and which bearing is located in the pocket 24 of the removable cap 23 that is threaded at 22 into the top of the casing 6. The crank shaft has a tapered extension 30 to which the socket 33 of the ball arm 35 is pivoted, the parts being keyed together as at 34 and held by a nut 32 threaded on the end 31 of the tapered shank 30, the arm 35 carries the ball 36 to which the socket of the steering rod (not shown) may be attached.

The yoke 37 is provided with one or more lugs 38 (the number depending upon whether the globoid-spiral consists of a single groove 3, as shown in Fig. 3, or a plural groove 3, as shown in Fig. 5) and the lug 38 projects into the groove 3 whereby as the shaft 1 is turned one way or another, the yoke 38 will be moved on the axis of the trunnions 28—29 toward or from the axis of the shaft 1, the lug 38 following the groove 3 as the ball 2 is turned.

It will be noticed that by reason of the formation of the globoid-spiral, the lug 38 will always be at the same distance from the center of the ball 2, and hence it is possible to transmit motion from the shaft 1 to the crank shaft by the direct connection 3—38 described. The casing 6 is also provided with a pocket 40 in which a combined collar and thrust ball bearing 41 is located, the shaft 1 having a cone 39 (formed on or fixedly secured to the shaft 1 in any desired way) which cone 39 serves as a thrust collar to take up the end thrust on the shaft 1 in an upward direction, while the ball 17 takes up the end thrust on the shaft 1 in a lower direction.

The construction illustrated in the accompanying drawings is but one form of the invention and has been designed for attachment to the well-known Ford car. It should, however, be understood that changes in the details of construction, arrangement of casing and bearing elements, etc., proportion of parts and mechanical details of the same may be altered or varied to suit the particular car on which the invention is to be employed.

It will be noticed that with the construction shown in order to assemble the parts, caps 23 and 13 are removed, the shaft 1 introduced through the opening provided by the removal of the cap 13 and the crank shaft introduced through the opening left by the removal of the cap 23.

While the ball bearings may be dispensed with and the shafts journaled in ordinary long bearings, nevertheless I prefer the construction illustrated for the reason that it admits of shorter shaft parts and a more compact arrangement of the coöperating elements than otherwise.

In operation, when the parts are positioned as shown in full lines in Fig. 4, for instance, the arm 35 is extending in the same general direction as the shaft 1, but by turning shaft half over in a right hand or left hand direction, the crank shaft may be moved on its axis to one side or the other to effect the steering act, as indicated in dotted lines in Fig. 4, as will be readily understood by reference to the drawings.

From the foregoing description taken in connection with the accompanying drawings, it is thought the complete construction, operation and advantages of my invention will be readily understood by those skilled in the art.

What I claim is:

1. In a steering mechanism, a casing, a steering post shaft journaled in the said casing, a crank shaft journaled in said casing, an arm secured on said crank shaft, and a globoid-spiral slot and pin connection between said shafts.

2. In a steering mechanism, a casing, a steering post shaft journaled in said casing, a crank shaft journaled in said casing, an arm secured on said crank shaft, a globoid-spiral slot and pin connection between said shafts, said shafts having their axes intersecting and normal to one another.

3. In a steering mechanism, a casing, a steering post shaft, bearing elements in the casing for sustaining said shaft, a ball on said shaft having a spiral groove in its surface, a crank shaft having trunnions, bearing elements carried by said casing for said trunnions, an arm on said crank shaft, and a pin carried by said crank shaft to engage in said groove whereby the motion of said steering post shaft will be directly transmitted to said crank shaft.

4. In a steering mechanism, a casing, a steering post shaft, bearing elements in the casing for sustaining said shaft, a ball on said shaft having a spiral groove in its surface, a crank shaft having trunnions, bearing elements carried by said casing for said trunnions, an arm on said crank shaft, a pin carried on said crank shaft to engage in said groove whereby the motion of said steering post shaft will be directly transmitted to said crank shaft, said bearing elements including thrust bearing members.

5. In a steering mechanism, a casing, a steering post shaft journaled in the said casing, a crank shaft journaled in said casing, an arm secured on said crank shaft, a globoid-spiral slot and pin connection between said shafts, said casing having openings closed by removable sections through which the respective shafts may be introduced.

6. In a steering mechanism, a casing, a steering post shaft, bearing elements in the casing for sustaining said shaft, a ball on said shaft having a spiral groove in its surface, a crank shaft having trunnions, bearing elements carried by said casing for said trunnions, an arm on said crank shaft, and a pin carried by said crank shaft to engage in said groove whereby the motion of said steering post shaft will be directly transmitted to said crank shaft, said bearing elements including thrust bearing members, said casing having openings closed by removable sections through which the respective shafts may be introduced.

7. A steering mechanism composed of a supporting casing, a steering post shaft, and a crank shaft having an arm, said shafts being journaled to turn on axes at right angles to one another, said shafts having a direct globoid-spiral pin and slot power transmitting engagement with one another.

8. A steering mechanism comprising a supporting casing, a steering post shaft and a crank shaft, said shafts journaled to turn on different axes, a globoid-spiral member on one of said shafts and a member on the other shaft for engaging said globoid-spiral member.

9. In a steering mechanism, a casing, a steering post shaft journaled in said casing, a crank shaft journaled in said casing, an arm secured on said crank shaft, a globular member on said steering post shaft having a spiral groove in its surface, the bottom of the groove being of equal radius throughout and whose radius of curvature extends from the center of said globular member, a pin on said crank shaft to engage said slot substantially as shown and described.

10. In a device of the character stated, a shaft, a globoid-spiral element on said shaft, and a member in operative engagement with said spiral element.

THOMAS J. NASH.